United States Patent [19]

Auchincloss

[11] Patent Number: 4,795,563
[45] Date of Patent: Jan. 3, 1989

[54] NITRATE ADSORPTION UNIT

[75] Inventor: Peter E. Auchincloss, Timonium, Md.

[73] Assignee: Hydroflo, Inc., Timonium, Md.

[21] Appl. No.: 144,675

[22] Filed: Jan. 13, 1988

Related U.S. Application Data

[63] Continuation of Ser. No. 21,347, Mar. 3, 1987, abandoned.

[51] Int. Cl.⁴ ............................................. C02F 1/28
[52] U.S. Cl. ..................... 210/662; 210/678; 210/683; 210/96.1; 210/143; 210/190; 210/279; 210/288
[58] Field of Search ............. 210/662, 678, 683, 96.1, 210/98, 143, 190, 191, 275–279, 288

[56] References Cited

U.S. PATENT DOCUMENTS

| | | | |
|---|---|---|---|
| 3,395,099 | 7/1968 | Johnson | 210/275 |
| 3,455,458 | 7/1969 | Johnson | 210/197 |
| 3,467,022 | 9/1969 | Techler et al. | 210/191 |
| 3,815,747 | 6/1974 | Clack et al. | 210/278 |
| 4,237,538 | 12/1980 | Le Dall | 210/143 |

OTHER PUBLICATIONS

Portasoft of Maryland, "NS Series Water Treatment Systems", brochure (1 page).

*Primary Examiner*—Ivars Cintins
*Attorney, Agent, or Firm*—Saidman, Sterne, Kessler & Goldstein

[57] ABSTRACT

An improved unit for removal of nitrates from water is disclosed, which features a cylindrical tank containing a nitrate-adsorbing resin bed and a dip tube/water distributor assembly. The assembly comprises a dip tube extending from an orifice in the upper portion of the tank to a lower distributor assembly, and an additional backflush tube having an open end disposed near the lower distributor assembly and communicating with an upper distributor located beneath the surface of the resin. A water flow restrictor is provided in the lower distributor assembly, such that when water is passed downwardly through the dip tube in a backflush mode, some of the water is squirted into the additional backflush tube, so that the backflush water flows into the resin bed at both its lower and upper portions. In this way, the resin bed is more effectively regenerated by subsequent supply of a brine solution than if the rinse water were only injected at the lower portion of the resin bed. This improved efficiency allows use of the nitrate-adsorbing resin bed for simultaneous removal of iron from the water stream.

13 Claims, 4 Drawing Sheets

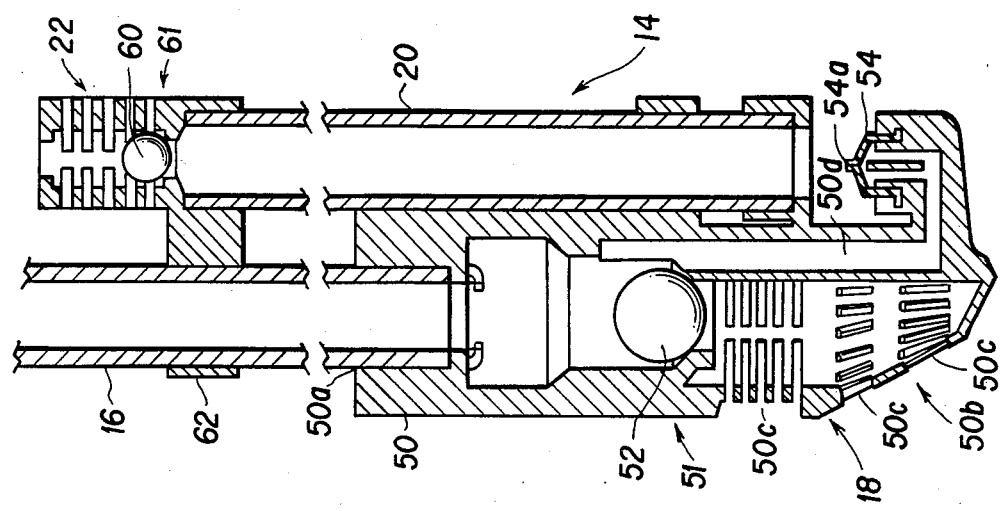
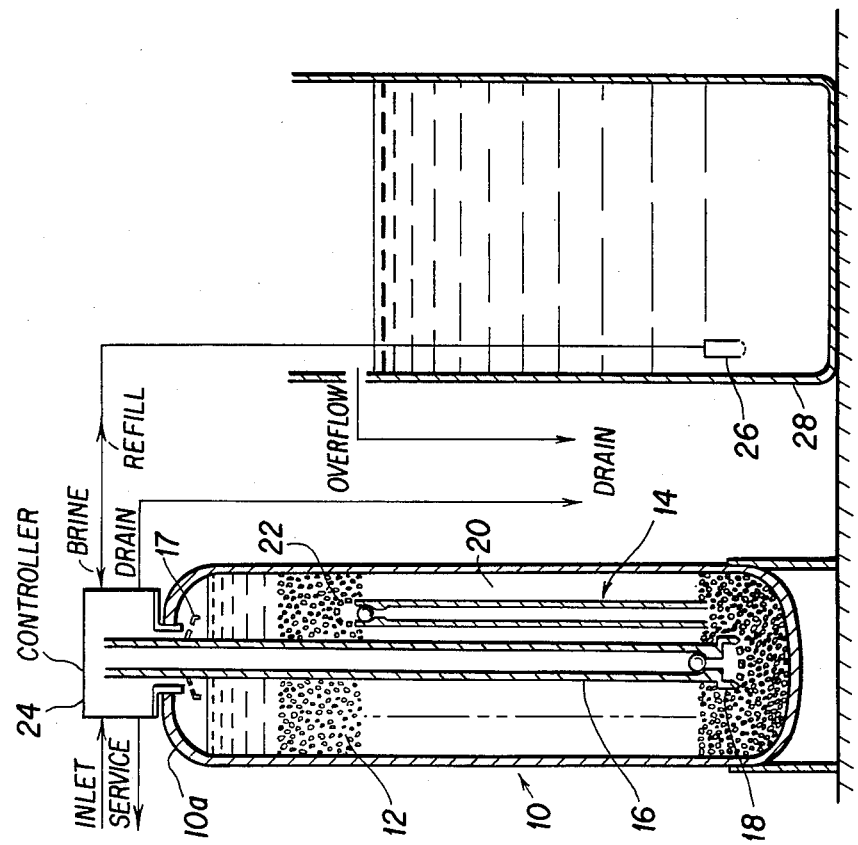

NITRATE ADSORPTION UNIT

This application is a continuation of application Ser. No. 21,347, filed Mar. 3, 1987, now abandoned.

BACKGROUND OF THE INVENTION

(1) Field of the Invention

This invention relates to an improved unit for removing nitrates from household drinking water.

(2) Related Art

Nitrates typically enter household well-water streams as the result of runoff from agricultural operations using nitrate-based fertilizers, which leach into the ground water. Where not removed from the water stream, such nitrates can be very dangerous and even fatal, particularly to infants.

It is known to remove nitrates from water by adsorption of the nitrates on a bed of resin beads contained in a tank through which all the household water is passed. Known nitrate adsorption units typically comprise a tank containing the adsorbing resin, a regenerant tank containing a brine regenerant solution, and control and valving apparatus for periodically regenerating the resin. The control and valving apparatus periodically causes the brine to flow through the resin bed, removing the adsorbed nitrates therefrom. It is also known to regenerate the resin at varying intervals dependent on the amount of water passed therethrough, and on the amount of nitrates in the water, that is, on a demand basis. After regeneration, the nitrate-laden brine solution is then discarded in a drain.

Typical regeneration sequences include a backflush step, in which water flows through the resin in the opposite direction from normal flow, followed by a brining step, in which a brine solution flows through the resin in the "normal" direction. Subsequently the resin can be rinsed by further water flow in the "normal" direction. It is known to control performance of such sequences of steps automatically in response to a determination that regeneration is required.

Typical prior designs for nitrate removal units include a vertical cylindrical tank, formed of fiberglass, containing a bed of the nitrate-removing resins. Water enters the tank through one or more inlet openings located in an annular pattern around the top of the tank. The water flows downwardly through the resin and exits through a dip tube having a perforated distributor disposed in the lower portion of the tank. The dip tube extends up the center of the tank and exits through its center. Typically, a quantity of gravel is disposed around the distributor at the bottom of the dip tube. The gravel prevents the neutralizing resins from being withdrawn via the dip tube during normal use.

In a typical backflush operation, water is forced down the dip tube, out through the distributor at the bottom of the tank, and returns upwardly through the gravel and the nitrate-removing resin. This "fluffs up" the resin, ensuring that it is all exposed to the incoming water stream and is thus efficiently used. After backflush, brine is supplied via the annular inlet opening(s) and flows downwardly through the resin and up through the dip tube, thus following the "normal" water flow path. The brine removes the adsorbed nitrates from the resin bed, regenerating it. The nitrate-laden brine is discarded in a drain. The resin bed is then rinsed by the incoming water, facilitating return to normal service.

One deficiency with such conventional systems is that if iron is present in the water stream, even at low levels, the iron tends to deteriorate the resin material of the bed, preventing it to some extent from adsorbing the nitrates. Accordingly, even very low levels of iron in the water stream require a separate iron removal device prior to the nitrate-adsorbing equipment. It would be preferable if at least low levels of iron could be tolerated without the necessity of use of this additional piece of equipment, thus simplifying water treatment in these cases. At the same time it is desired to improve the efficiency of use of the nitrate-adsorbent resin.

SUMMARY OF THE INVENTION

According to the present invention, a nitrate removal unit is provided with an improved dip tube assembly, comprising a dip tube terminating in a lower distributor disposed in the resin bed near the base of the tank and an additional tube extending from the vicinity of the lower distributor upwardly to an upper distributor located in the upper portion of the resin bed. This assembly is arranged such that some of the backflush water passes into the lower portion of the resin bed and some through the additional tube directly to the upper portion of the resin bed. This provision of dual flow paths has the effect that the resin bed is backflushed much more efficiently than with the single lower distributor dip tube previously used. The improvement in resin regeneration efficiency is so pronounced that a significant quantity of iron in the water can be tolerated with destruction of the nitrate removal capability, and without provision of a separate unit for iron removal. Nitrate use is also enhanced.

BRIEF DESCRIPTION OF THE DRAWINGS

The invention will be better understood if reference is made to the accompanying drawings, in which:

FIG. 1 shows a partly schematic, partly cross-sectional view of the nitrate removal apparatus according to the invention;

FIG. 2 shows a detailed cross-sectional view of the water dip tube assembly.

DESCRIPTION OF THE PREFERRED EMBODIMENTS

Figure 3:
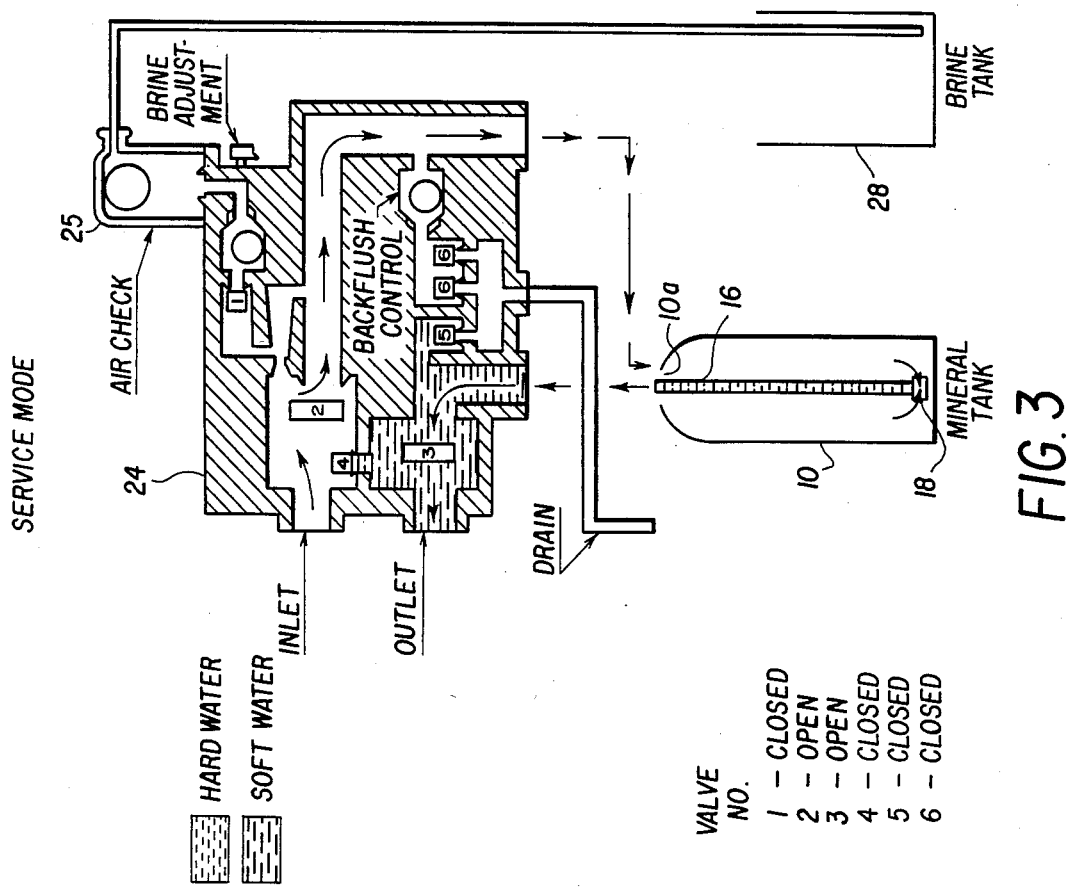
FIGS. 3, 4, 5, 6, and 7 show respectively water flow in the service, backflush, brining, slow rinse, and brine refill and purge modes of operation of the apparatus of the present invention.

FIG. 1 shows the arrangement of the major components of the nitrate removal system according to the invention. A tank 10 contains a bed 12 of resin beads selected for their ability to adsorb nitrates from an incoming water stream. The tank 10 may be a model 844 fiberglass tank obtained from the Structural Fibers Division of ESSEF Corporation of Chardon, Ohio, and the resin 12 may be the IONAC A-554 strong base type II anion exchange resin available from Sybron Chemicals, Inc., a subsidiary of Sybron Corporation, Birmingham, N.J.

Disposed within the tank 10 is a water distributor/dip tube assembly 14 which may in the preferred embodiment be a Model 200 backwash distributor or "turbulator" available from the Autotrol Corporation of Milwaukee, Wis. This device bears reference to U.S. Pat. Nos. 3,395,099 and 3,455,458. The structure of the dip tube/water distributor assembly 14 is detailed in connection with FIG. 2. In essence, assembly 14 comprises a dip tube 16 which reaches from a central orifice in the upper end of the tank 10 down to a lower distributor assembly 18, a further backflush tube 20, and an upper distributor 22. Backflush tube 20 has an open end in the vicinity of the lower distributor assembly 18 and is connected to an upper water distributor 22 at its upper end.

In normal use, nitrate-bearing water enters the tank 10 through one or more annular openings 10a around the central dip tube 16 and passes downwardly through the resin bed 12. The resin adsorbs the nitrates. The purified water enters the dip tube 16 via the lower distributor 18, passes upwardly, and out to service.

In backflush, water flows in the reverse direction; the backflush water enters the tank 10 through the dip tube 16 and is dispersed outwardly through the resin bed 12 by the lower distributor 18. However, some fraction of the backflush water passes directly upwardly through the backflush tube 20 and outwardly through the upper distributor 22. As described above, this provision of dual water distribution points has the effect of "fluffing up" the resin beads such that they can efficiently adsorb nitrates even when the water stream contains some iron. Furthermore, use of this dip tube/water distributor assembly 14 allows elimination of any gravel or material other than the resin 12 in the tank.

Water flow control for the apparatus of this invention is provided by a controller 24. In the preferred embodiment, controller 24 is a Model 460MP Electronic Control System, also available from the Autotrol Corporation. This controller is fully described in Autotrol brochure R230 which is incorporated herein by reference. Briefly stated, the Autotrol controller 24 comprises means for measuring the amount of water which actually flows through the system. At intervals, typically once per day, the controller compares the actual amount of water used during the preceding 24-hour period to the average amount used per day since the last regeneration, to determine whether the adsorbing capacity of the resin can be expected to be sufficient for another day. Typically, the controller 24 is operated so as to regenerate the resin when it has reached 80% of its nitrate-adsorption capabilities. If the controller 24 determines that it is likely that the resin will reach 80% of its adsorbing capacity during the next 24-hour period, then the regeneration cycle (described below in connection with FIGS. 3-7) is initiated.

The Autotrol Model 460MP controller used according to the preferred embodiment of the invention has the additional advantage that the installer need merely set the controller according to the amount of nitrates in the incoming water in order to allow it to determine how many gallons of water should be permitted to pass through the resin before regeneration should be initiated. This simplifies the calculations required of the installer and renders the entire assembly highly foolproof in service. The Autotrol controller also accepts a 9-volt battery for backup, that is, to maintain its memory in the event of power failure.

Preferably, the controller 24 is connected to the inlet, outlet and drain lines by a bypass valve (not shown) which permits convenient disconnection of the nitrate removal system of the invention for service. The Model M9470 bypass valve, also sold by the Autotrol Company, is suitable.

As shown in FIG. 1, the controller 24 controls the interconnections of the openings 10a in tank 10, the dip tube 16, an inlet connection to which incoming water is supplied, a service connection, connected to the household plumbing, a brine connection connected to a brine tank 28 and a drain connection, which is simply plumbed to a suitable drain. The interconnections of these flow connections, which are made by operation of the controller 24, are detailed below in connection with FIGS. 3-7.

The brine tank 28 in the preferred embodiment may be formed of polyethylene. Suitable tanks are available from the Clack Corporation of Windsor, Wis. The inventor finds that in typical use a brine tank, containing 250 pounds of salt, is sufficient for several months' regeneration. The tank 28 is provided with an overflow line 30, which may be plumbed to a separate drain connection, as indicated. As shown, a filtration device 26 may be provided at the end of a tube connected to the brine input of the controller 24.

FIG. 2 shows a cross-sectional view detailing the structure of the dip tube/water distributor assembly 14. The dip tube 16 itself comprises a section of plastic tubing, which is received in a recess 50a in a housing 50 of the lower water distributor 18. The distributor housing 50 defines a hollow lower section 50b which has a large number of orifices 50c formed therein for allowing water passage therethrough. In normal flow, that is, when water flows through the resin bed for nitrate removal, water flows in through the orifices 50c, around a ball 52 provided as part of a check valve assembly 51 and upwardly through the dip tube 16 to the service connection shown in FIG. 1.

When backflush is being performed, water is supplied to the top of the dip tube 16. Ball 52 prevents passage of the backflush water into the open portion 50b of the housing 50. Instead, the backflush water passes through an internal passage 50d in the housing 50 and exits through a resilient rubber "spritzer" 54. Spritzer 54 comprises a generally cylindrical portion and an end portion. The end portion has a slit 54a formed therein, such that when the water passes downwardly through the passage 50d, the sides of the slit 54a in the spritzer 54 part. During normal flow, the slit 54a in the spritzer is essentially closed. During backflush, water moves through the passage 50d at relatively high velocity due to its small cross-sectional area. Hence, some of the water passing outwardly through the slit 54a in the spritzer 54 is "squirted" upwardly into the backflush tube 20 and passes out through the upper distribution assembly 22. The remainder of the backflush water passes into the resin bed in the vicinity of the lower distributor 18. In this manner, the backflush water enters the resin bed at spaced locations; this improves the "fluffing up" of the beads of the resin bed significantly. After backflushing, the water exits the tank 10 through the orifice(s) 10a and is sent to the drain.

As shown, the upper distributor 22 is provided with an additional ball valve assembly 61 comprising a ball 60. This valve 61 prevents water from flowing down the backflush tube 20 in normal service; such flow would bypass the resin and prevent removal of nitrates from the water. The backflush tube 20 and the distributor assembly 22 may be stabilized by being clamped by a clamp 62 to the dip tube 16, as indicated. In the preferred embodiment, the upper end of the dip tube 16 additionally is provided with a concentric perforated collar 17 (FIG. 1) which prevents resin from escaping via the annular orifices 10a around the dip tube 16 during the backflush process.

As mentioned, the upper distributor 22 is disposed beneath the upper surface of the resin bed 12 in tank 10 so that the backflush water is distributed at two points within the resin bed. This ensures that the resin beads are thoroughly fluffed up, so that any adhesions between the individual beads of the resin bed are broken, and so that the surfaces of the resin are all subsequently exposed to the brine, whereby the nitrates are fully removed therefrom, and ensuring that the resins are used efficiently.

As mentioned, the fact that according to the invention the resins are regenerated very completely permits the resin to tolerate iron in amounts of up to approximately 0.3 ppm in the incoming water stream. This amount of iron can be quite troublesome in a water stream; its removal has previously required use of a separate iron removal unit. Toleration of this amount of iron by the nitrate removal unit of the invention without provision of a separate iron removal apparatus and without deterioration of the resins, preventing their continued use for nitrate removal, is a substantial advantage.

FIGS. 3-7 are all schematic diagrams of the valving provided in the control unit 24. Valves 1-6 are provided. Valves 1 through 6 may be referred to respectively as a brine valve, inlet valve, outlet valve, bypass valve, rinse drain valve, and backflush valve. FIGS. 3 through 7 show the different combinations of valves 1-6 which are opened in the various water flow modes of the system of the invention, thus varying the water flow patterns through the controller 24 and through the nitrate removal system of the invention.

In each of FIGS. 3-7, the water flow paths are shaded and are indicated by arrows. The lighter shading in each case represents the hard water, that is, the nitrate-laden inlet water to be treated, whereas the darker shading represents the treated water. The nature of the treated water varies according to the step. Thus, for example, in FIG. 3, depicting flow in the service mode, the hard water is shown flowing into the controller 24 at an inlet opening, around valve 2, which is opened, into the mineral tank 10, downwardly through the resin (not shown), into the dip tube 16 through the lower distributor 18, upwardly into the controller 24, and out through an outlet passage via valve 3, which is opened. Thus, in the service mode, the hard water simply passes through the nitrate-adsorbing resin bed and to service.

FIGS. 4-7 show the steps in the resin regeneration process which, as described above, is initiated by the controller 24 when its internal calculations indicate that the resin bed is approaching 80% of its nitrate-adsorption capability.

Figure 4:
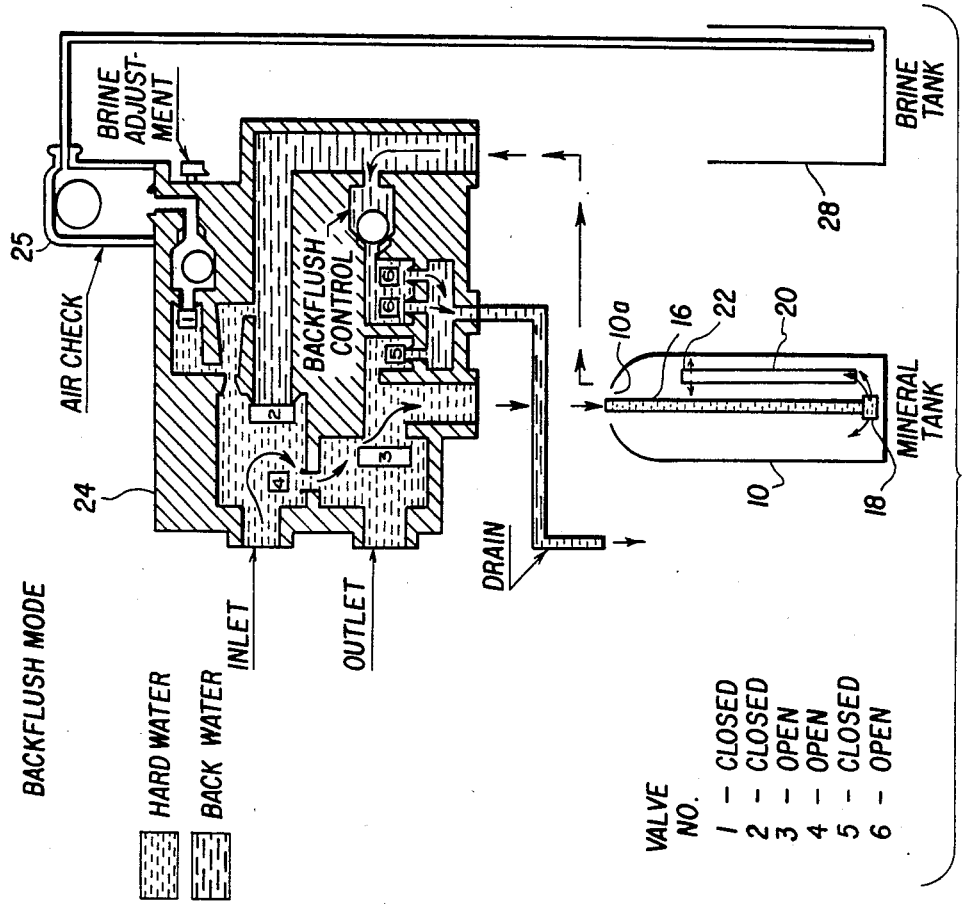

In FIG. 4, which shows flow in the backflush mode, the hard water passes in at the inlet, around valve 4, valve 2 being closed, and thence downwardly through the dip tube. Part of the backflush water passes upwardly through the backflush tube 20 and out into the resin bed via the upper distributor 22; the remainder passes directly into the lower portion of the resin bed. In this manner, backflush water enters the resin bed in the vicinities of both the lower distributor 18 and the upper distributor 22. As mentioned, this very effectively fluffs the resin bed and ensures that the brine which is subsequently supplied reaches all the surfaces of the resin beads. Backflush water leaves the tank through the annular orifice(s) 10a, passes through a backflush control, which is a ball valve limiting the rate of flow of the backflush water, ensuring that the backflush process is not too violent, and flows outwardly through two backflush drain valves 6 to the drain.

Figure 5:
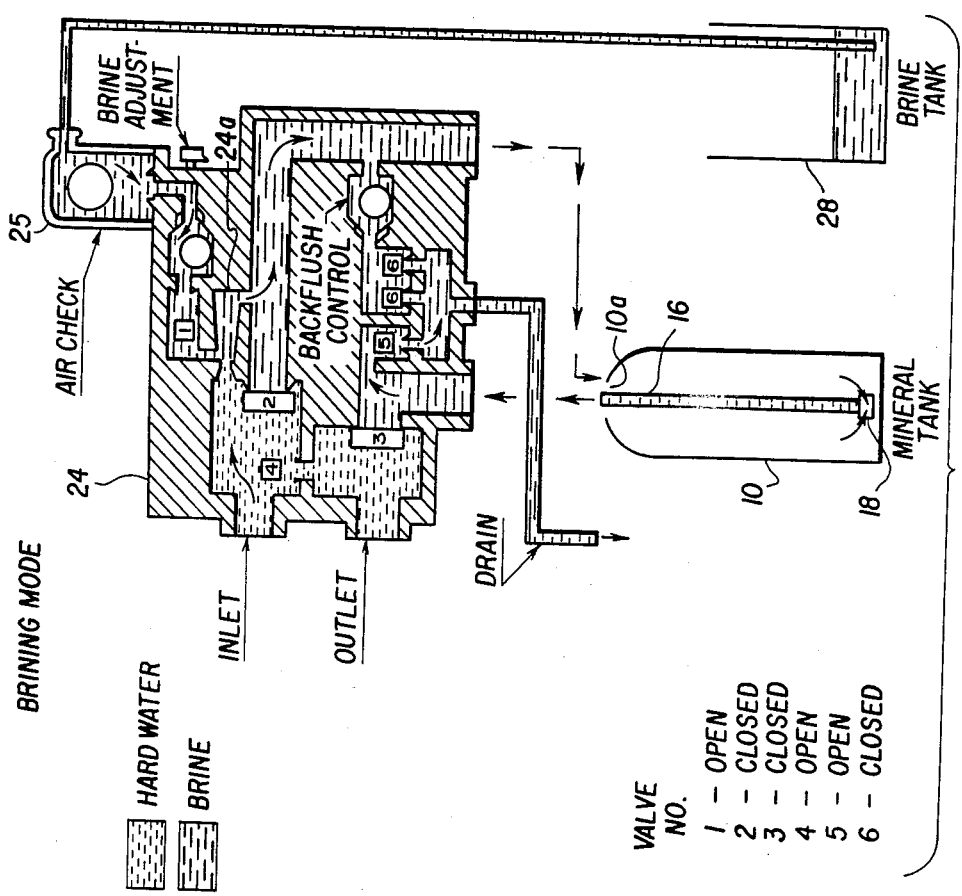

Flow in the brining mode is shown in FIG. 5. In this case, the inlet hard water flows through a venturi passage 24a in the body of the controller 24. The vacuum created draws brine from the brine tank 28 which is mixed with the hard water. The mixture flows through the annular orifice(s) 10a in the tank 10. The brine and water mixture passes generally downwardly through the resin bed in the mineral tank 10, removing the adsorbed nitrates from the resin bed, and exits through the dip tube 16 to the drain via valve 5. The flowing brine holds an air check valve 25 open.

Figure 6:
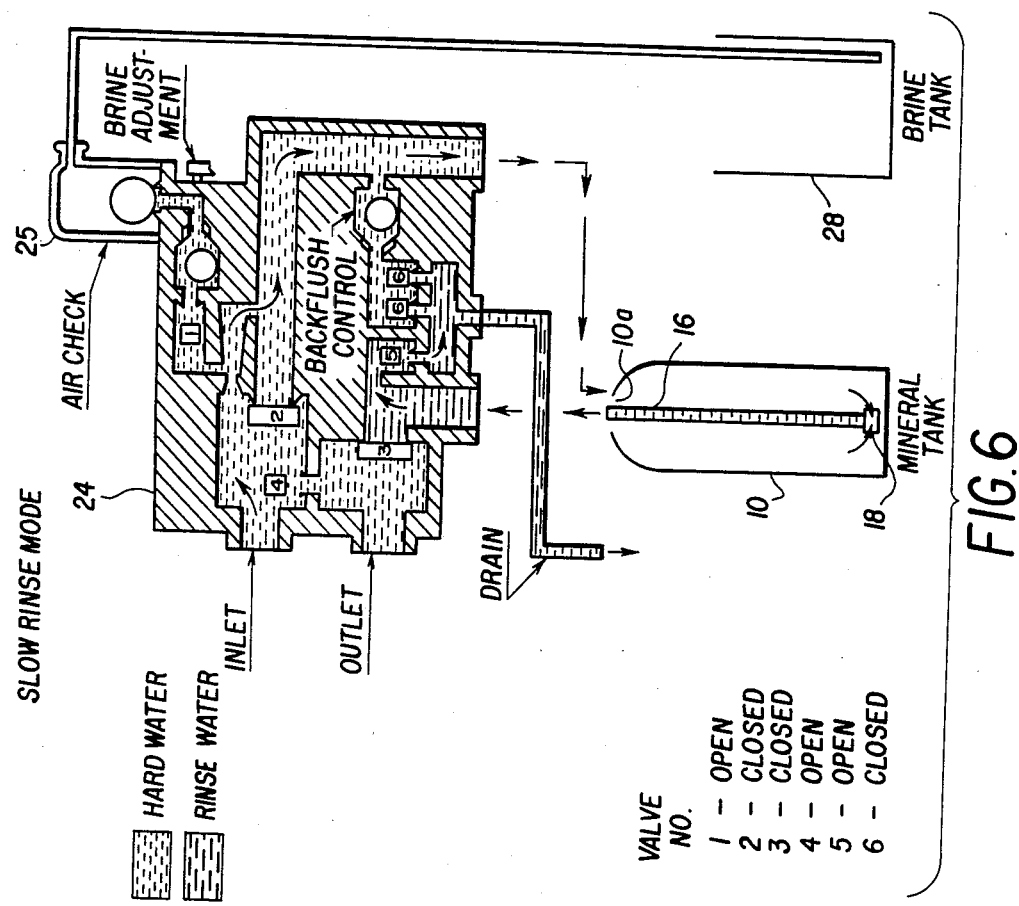

Flow in a subsequent slow rinse mode is shown in FIG. 6. The slow rinse mode is begun when the brine has all been removed from the brine tank 28 during the preceding step; at this time, air check valve 25 closes, initiating the slow rinse mode of operation. The slow rinse step ensures that the brine is fully rinsed from the resin bed. In this case, the hard water simply passes downwardly through the resin and exits via the dip tube 16 and valve 5 to the drain.

Figure 7:
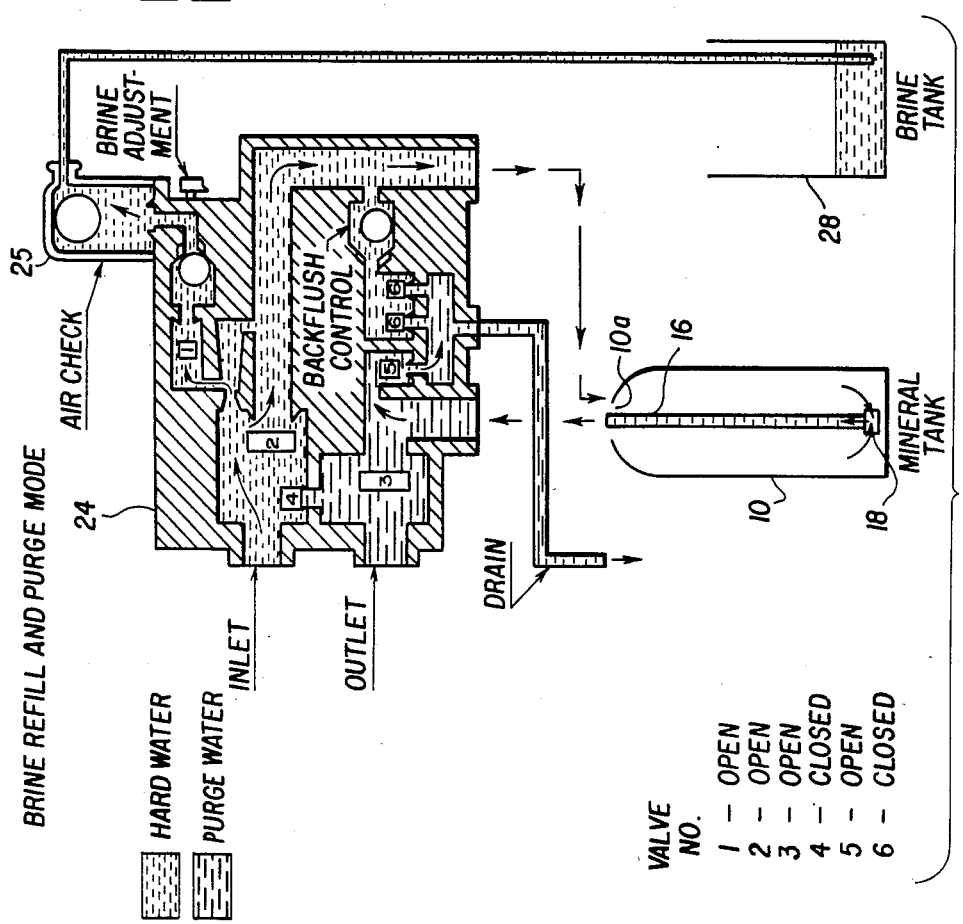

In FIG. 7, flow in a brine refill and purge mode is shown. In this case, hard water is supplied both to the brine tank 28 via valve 1, refilling it with fresh brine, and to the resin bed via valve 2, rinsing the bed further. The rinse flow rate in the mode of FIG. 7 is high relative to that of FIG. 6, due to the additional opening of valve 2. The brine tank 28 is thus refilled and the resin bed is fully purged of any remaining rinse water. Water leaving the tank 10 via the dip tube 16 in the brine refill and purge mode of FIG. 7 is sent to the drain. When the regeneration process is concluded, the service mode of FIG. 3 is once again entered, and the unit is returned to service.

While a preferred embodiment of the invention has been described, this should not be considered as a limitation on the invention, which is to be measured only by the following claims.

What is claimed is:

1. A method for removing nitrates from a household well water stream, comprising the steps of:
   providing a generally cylindrical, vertical mineral tank assembly, said assembly comprising a tank, containing a quantity of a nitrate-adsorbing resin, a dip tube in said tank having an inlet opening at its upper end and a first water distributor at its lower end, a backflush tube in said tank having an inlet opening at a lower end and a second water distributor at an upper end, said second water distributor being disposed beneath the upper level of said quantity of said nitrate-adsorbing resin in said tank, and means for causing water to flow between the lower end of said dip tube and said backflush tube;
   providing control means for defining a first normal water flow path and a second backflush flow path;
   said first normal water flow path extending from an inlet source of water to be treated, through at least one opening in the upper portion of said tank outside said dip tube, downwardly through said nitrate-adsorbing resin, into said first water distributor, up said dip tube, and out through a service outlet; and
   said second backflush flow path extending downwardly through said dip tube, and simultaneously out through said first water distributor and up through said nitrate-adsorbing resin and upwardly through said backflush tube and out through said second water distributor, and out through said at least one opening in the upper portion of said tank outside said dip tube;

passing a nitrate-containing water stream through said first normal water flow path; and monitoring the flow of said water through said mineral tank;

operating said control means to switch the flow of said nitrate-containing water stream from said first normal water flow path to said second backflush flow path when said monitoring step indicates that the capacity of said nitrate-adsorbing resin to adsorb nitrates is substantially exhausted;

constraining water flow down said dip tube during backflush of said resin to pass through an orifice of smaller diameter than the inner diameter of said dip tube;

injecting a portion of the water flowing through said orifice into the lower end of said backflush tube; and dispersing the remaining portion of said water flowing through said orifice throughout said resin.

2. The method of claim 1, comprising the additional step of flowing a brine solution substantially along said normal path to remove nitrates from and thus regenerate said resin.

3. The method of claim 2, comprising the further step of rinsing the resin after said regeneration.

4. The method of claim 3, wherein said orifice is defined by a resilient member having an opening in it and comprising the further step of closing said opening except during said backflush step.

5. The method of claim 1, wherein said operating said control means step comprises:

switching the water flow of said nitrate-containing water stream from said first normal water flow path to said second backflush flow path when said monitoring step indicates that the capacity of said nitrate-adsorbing resin to adsorb nitrates is about 80 percent exhausted.

6. The method of claim 1, further comprising the step of preventing water from flowing down said backflush tube while it is passing through said first normal water flow path.

7. Apparatus for removing nitrates from a potable water stream, comprising:

a dip tube;

a vertically extending, generally cylindrical tank having an orifice at its upper end communicating with said dip tube and an orifice in its upper end outside said dip tube;

said dip tube extending vertically downwardly in said tank;

a lower water distributor affixed to the lower end of said dip tube;

an additional vertically extending backflush tube having an open lower end disposed in the vicinity of said lower water distributor into said tank and an upper end communicating with an upper water distributor located in the upper portion of said tank;

a quantity of nitrate-adsorbing resin being disposed in said tank, said quantity of nitrate-adsorbing resin being sufficient that said upper distributor is covered by said nitrate-adsorbing resin; and flow control means disposed in said lower water distributor assembly for control of water flow therethrough so that during a backflush mode of operation, in which water is supplied to the top of said dip tube, some of said water passes outwardly through said lower distributor into the lower portion of said quantity of said nitrate-adsorbing resin and some of said water passes upwardly through said additional backflush tube and outwardly through said upper distributor into the upper portion of said quantity of nitrate-adsorbing resin, whereby said nitrate-adsorbing resin may be effectively regenerated by a subsequent supply of a brine solution thereto.

8. The apparatus of claim 7, further comprising controller means for controlling flow of water through said tank, dip tube and backflush tube.

9. The apparatus of claim 8, wherein said controller means comprises means for measuring the actual flow of water through said resin, for determining when said resin has approached its nitrate adsorbing capacity, and for thereupon initiating regeneration.

10. The apparatus of claim 9, wherein said controller means initiates regeneration of said nitrate-adsorbing resin when said nitrate-adsorbing resin has reached about 80 percent of its nitrate-adsorbing capacity.

11. The apparatus of claim 7, wherein said flow control means disposed in said lower water distributor assembly comprises a flow passage of smaller diameter than the inner diameter of said dip tube, and an orifice communicating with said flow passage and axially aligned with said open lower end of said backflush tube.

12. The apparatus of claim 7, wherein said upper water distributor comprises a ball valve assembly.

13. The apparatus of claim 7, further comprising a perforated collar disposed concentrically on the upper end of said dip tube.

* * * * *